Nov. 3, 1936.    C. AMBRUSTER    2,059,506
STORAGE BATTERY TERMINAL POST STRUCTURE
Filed Nov. 1, 1932
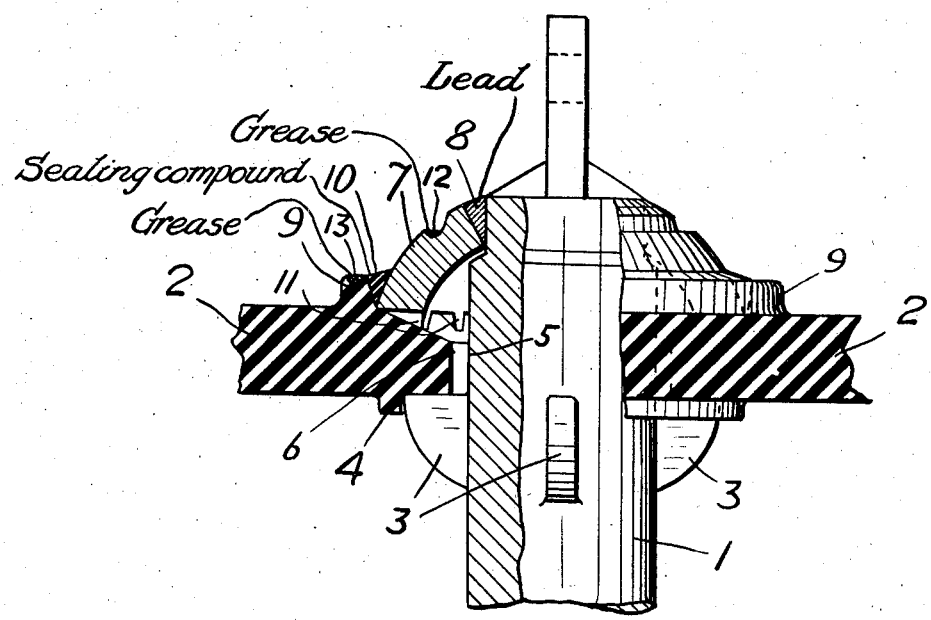
WITNESS:
Rob R Ritchel.
INVENTOR
Cornelius Ambruster
BY
Augustus B Stoughton
ATTORNEY.

Patented Nov. 3, 1936

2,059,506

UNITED STATES PATENT OFFICE 2,059,506

STORAGE BATTERY TERMINAL POST STRUCTURE

Cornelius Ambruster, Roslyn, Pa., assignor to The Electric Storage Battery Company, Philadelphia, Pa., a corporation of New Jersey Application November 1, 1932, Serial No. 640,604

9 Claims. (Cl. 136—168)

The subject of my invention is an improved structure of the assembly of a terminal post in the cover of a storage battery cell.

The object of the present invention is to provide means for sealing the terminal post of a storage battery cell to the cover through which it projects and especially to provide such a seal as will be effective above the cover, leaving the space between the post and the walls of the opening through the cover in free communication with the interior of the cell and the electrolyte contained therein, eliminating any secluded or capillary spaces adjacent to the surfaces of the terminal posts and attachments where electrolytic corrosion may take place, and also to provide means for confining any seepage of electrolyte through the cover opening, for draining same back into the cell and for preventing creepage of same along outside surfaces of post and cover.

For a further exposition of my invention reference may be had to the annexed specification and drawing at the end of which my invention will be specifically pointed out and claimed.

The single figure of the drawing is a side elevation of my device with parts broken away in vertical cross section.

The drawing shows a terminal post 1 passing through an opening in the cover 2. The post 1 is provided under the cover 2 with several lugs or brackets 3, integral with the post, on which the cover rests. On the underside of the cover is a circular rim 4, which serves to locate the post and projecting lugs centrally in the opening through the cover. The clearance between the vertical surface 5 of the post and the inner wall 6 of the opening in the cover is made greater than the clearance between the rim 4 and the lug 3, so that the surface of the post 5 cannot come directly into contact with the surface 6 of the hole through the cover.

In the construction shown, a ring or collar 7 is placed over the post and rests on the upper surface of the cover. It will be noted that between the ring and the post an annular trough is formed, practically closed at the bottom where the lower circumference of the ring 7 abuts against the vertical surface of the post, and into this trough molten metal is introduced and fused to the adjacent surfaces by means of a flame. Thus, ring 7 is autogenously welded to post 1 by so-called lead burning, the joint formed by the fused metal being indicated at 8.

The lower or bearing surface of the collar is provided with narrow projecting pads 11, arranged radially around the collar. The collar rests on the cover 1 through these pads. Between the balance of the collar surface and adjacent underlying surface of the cover, non-capillary spaces remain which are in complete communication with the interior of the cell and its contained electrolyte, thus eliminating any confined capillary spaces between the collar and cover, where electrolytic corrosion might originate. These pads are tapered to a minimum thickness at the outer circumference of the collar, so that no aperture is left between the collar and the cover at this point through which the sealing material, later referred to, would leak from the trough 10 into the cell.

This collar, if desired, but not necessarily, can be of such dimensions that through the post it will serve to support the weight of the element suspended from the cover.

Surrounding the ring or collar 7 is an upstanding rim 9 on the upper surface of the cover, which provides an outer trough 10, which being filled with a sealing material, forms a bond between the cover and the ring and thus prevents the escape of electrolyte from the interior of the cell over the top of the cover. The sealing itself is thus between the approximately vertical surfaces of the collar and the surfaces of the cover recess outside the collar circumference. The seal is thus entirely on unconfined surfaces and the sealing material being of a plastic nature, initial corrosion cannot develop pressure and result in the formation of confined capillary spaces in which progressive corrosion might take place.

It will be particularly observed that the post proper, which is the current carrying member or terminal of the cell is entirely out of contact with the cover and since it is at such contact points and confined spaces adjacent thereto that electrolytic corrosion originates, the post proper is, by this construction, entirely removed from the corrosion zone.

Annular grooves 12 and 13 are provided in the upper surfaces of the ring and cover which can be filled with an acid repelling material, such as grease or oil and thus any creepage over the outside surfaces of post or cover of electrolyte, which, in the course of time, may seep into the sealing recesses, will be prevented. The recess itself is sloped radially toward the cover hole to provide drainage of electrolyte back into the cell.

It will be understood that during the process of assembling the post and cover in accordance with the design described above, means will preferably be provided for temporarily clamping the cover between the ring 7 and the lugs 3, while the lead burning is done at the joint 8, so that when the assembly is completed, the cover itself will be firmly clamped between the lugs and the collar 7.

I do not intend to be limited in the practice of my invention save as the scope of the prior art and of the attached claims may require.

I claim:

1. In a structure for sealing a terminal post to the cover of a battery cell, a cover having an orifice therein, a metallic terminal post passing through and spaced from the walls of the orifice by a non-capillary space, lugs on the post beneath the cover contacting with and providing an interrupted bearing against the underside of the cover around the orifice, a metallic collar surrounding the post above the cover autogenously welded to the post and bearing directly upon the cover around the orifice, and sealing means between said collar and the cover comprising a sealing channel in the surface of the cover external to the collar and filled with sealing compound.

2. In a structure for sealing a terminal post to the cover of a battery cell, a cover having an orifice therein, a metallic terminal post passing through and spaced from the walls of the orifice by a non-capillary space, lugs on the post beneath the cover contacting with and providing an interrupted bearing against the underside of the cover around the orifice, an annular projection from the underside of the cover adapted to cooperate with the lugs to position the post clear of the orifice, a metallic collar surrounding the post above the cover autogenously welded to the post and bearing upon the cover around the orifice, and sealing means between said collar and the cover comprising a sealing channel in the surface of the cover external to the collar and filled with sealing compound.

3. In a storage battery cell, a cover having a hole therein, a terminal post projecting through said cover, an external collar homogeneous with said post bearing directly on said cover, means for sealing said collar externally to said cover, and a non-capillary clearance space around said post through said hole in the cover and between said collar and the adjacent underlying surface of the cover in communication with interior of the cell and the electrolyte contained therein to provide a drain from said space.

4. In a storage battery cell, a cover having a hole therein, a terminal post projecting through said cover, an external collar homogeneous with said post bearing directly on said cover, means for sealing said collar externally to said cover, non-capillary clearance spaces around said post through said hole in said cover, such spaces being in communication with the interior of the cell and the electrolyte contained therein, and tapered non-capillary clearance spaces between said collar and adjacent underlying surface of said cover in communication with the interior of the cell and the electrolyte contained therein to provide a drain from said space and blocked from the means for sealing said collar on the exterior of the cover.

5. In a storage battery cell, a cover having a hole therein, a terminal post projecting through said cover, an external collar homogeneous with said post, non-capillary clearance spaces around said post through said hole in said cover and between said collar and the underlying surface of cover, said spaces being in communication with the interior of said cell and the electrolyte contained therein, a concave recess on the upper surface of the cover concentric with the post hole and drained to said post hole, and means for sealing said collar in said recess.

6. In a storage battery cell, a cover having a post hole therein, a terminal post projecting through said cover, an external collar homogeneous with said post, said terminal post and a portion of said collar being spaced from said cover to provide non-capillary clearance passages therebetween, a concave recess in the upper surface of the cover concentric with the post hole and drained to said post hole, means for sealing said collar in said recess, a channel in the upper surface of the cover girdling said recess, and acid-repelling material in said channel.

7. In a storage battery cell: a cover having an aperture therethrough; a terminal post projecting through the aperture and out of contact with the walls thereof; a plurality of lugs spaced apart, projecting from, and integral with the post, bearing against the underside of the cover; and a collar surrounding and connected to the post solely by a weld and bearing on the upper side of the cover at a point spaced from said post whereby the cover is clamped between the collar and the lugs.

8. In a storage battery cell: a cover having an aperture therethrough; a terminal post projecting through the aperture and out of contact with the walls thereof; a plurality of lugs spaced apart, projecting from, and integral with the post, bearing against the underside of the cover; a collar surrounding and connected to the post solely by a weld and bearing on the upper side of the cover at a point spaced from said post whereby the cover is clamped between the collar and the lugs; and means externally surrounding the perimeter of said collar for sealing said collar to said cover.

9. In a storage battery cell: a cover having an aperture therethrough; a terminal post projecting through said cover and spaced from the walls of said aperture by a non-capillary space; a plurality of lugs, spaced apart, projecting from and integral with the post, bearing against the underside of the cover; an external collar surrounding and connected to the post solely by a weld and bearing on the upper side of the cover, whereby the cover is clamped between the collar and the lugs; a channel in the upper surface of said collar girdling said post; acid-repelling material in said channel; and means for sealing said collar, externally of its periphery, to said cover.

CORNELIUS AMBRUSTER.